Patented Feb. 8, 1938

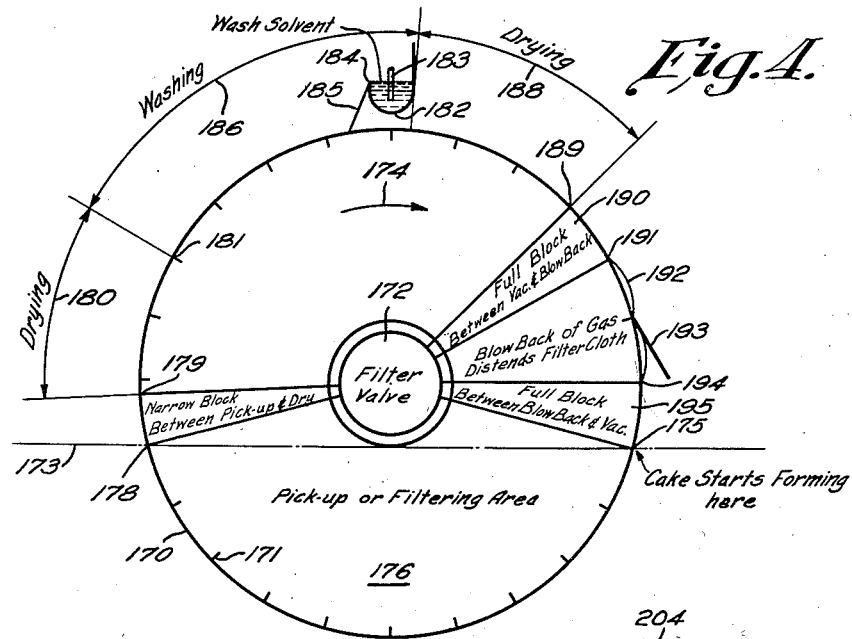
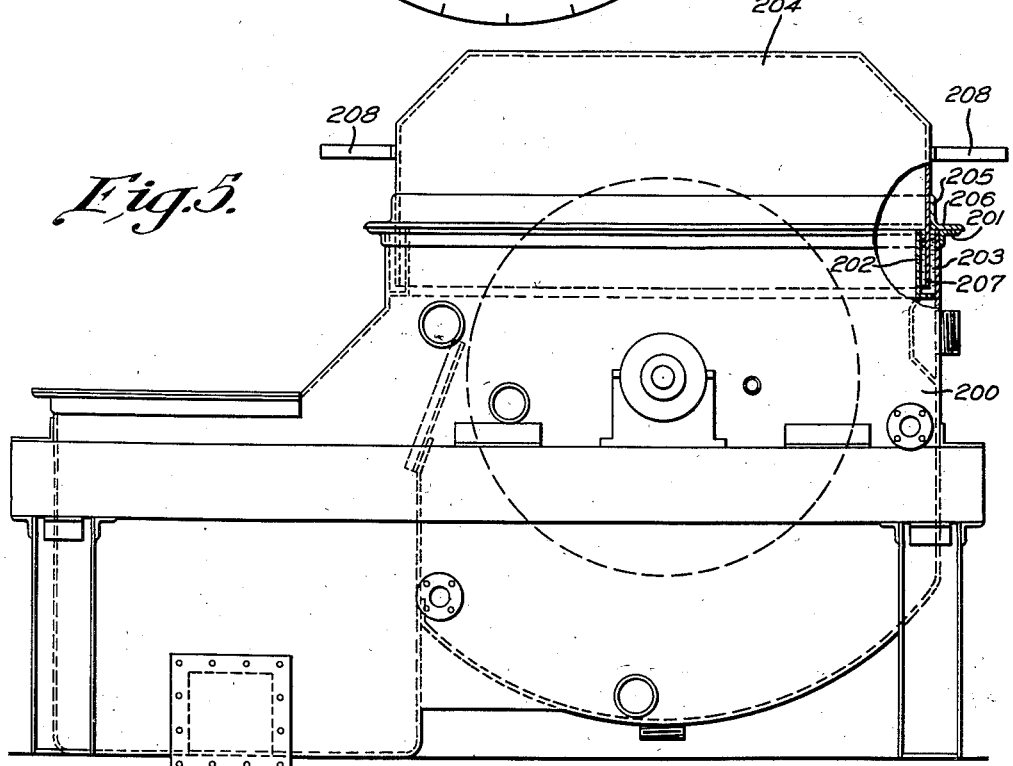

2,107,664

UNITED STATES PATENT OFFICE 2,107,664

SEPARATION OF WAX FROM MINERAL OIL BY FILTRATION

William Provine Gee, Plainfield, N. J., assignor to The Texas Company, New York, N. Y., a corporation of Delaware Original application March 31, 1934, Serial No. 718,347. Divided and this application February 12, 1935, Serial No. 6,151. Renewed July 16, 1937

7 Claims. (Cl. 210—199)

This invention relates to the dewaxing of mineral oil by continuous filtration.

An object of the invention is to provide apparatus for dewaxing mineral oil by the employment of a continuous rotary filter, which apparatus will be satisfactory and practical for large scale commercial operation.

This application is a division of my copending application, Serial No. 718,347, filed March 31, 1934, which in turn is a continuation-in-part of my copending application, Serial No. 607,270, filed April 25, 1932.

In order to better understand the invention, reference is made to the accompanying drawings which disclose preferred embodiments of the invention, and in which Fig. 1 is a diagrammatic view of apparatus constructed in accordance with the present invention;

Fig. 4 is a diagrammatic view illustrating the filtering cycle; and

Fig. 5 is an elevational view of a continuous filter suitable for carrying out the present invention, certain parts being broken away and in section in order to illustrate the construction thereof.

Figure 1:
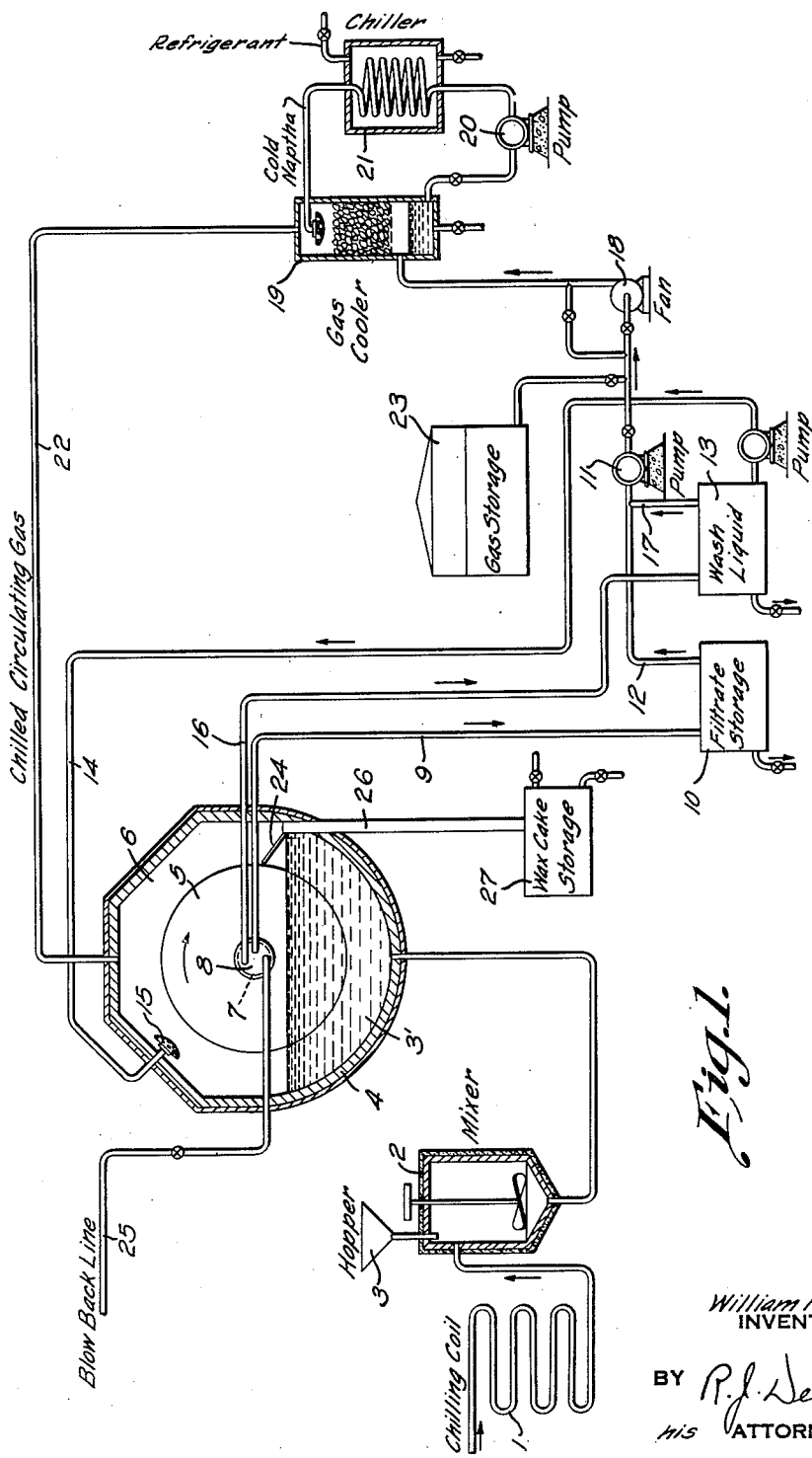

Referring to Fig. 1, the wax-bearing mineral oil, such as cylinder stock, is advantageously mixed with a solvent liquid or wax-precipitating medium. This solvent liquid may comprise a light petroleum fraction, such as naphtha or various other organic solvent liquids or mixtures thereof, including alcohols, ketones, aldehydes, cyclic hydrocarbons, benzol or its homologues, or derivatives of these various materials.

The mixture of oil and solvent liquid is delivered from a source not shown in the diagram and conducted through a chilling coil 1 wherein it may be cooled to a temperature of around 0° F. or below. The chilled mixture is then introduced to a mixer 2 wherein it is admixed if desired, with a comminuted solid filter-aid material introduced to the mixer from a hopper 3. The mixer is preferably provided with a jacket into which a refrigerant may be introduced, or through which it may be circulated in order to maintain the mixture in a chilled condition.

This chilled mixture of oil, precipitated wax and filter-aid material is then conducted to the bowl 3' of a filter 4. This filter is advantageously of the continuous rotating drum type, somewhat similar in general principles to that employed heretofore in industrial filtration. The exterior of the filter shell is covered with heat-insulating material to facilitate maintaining the interior in a cool condition.

During rotation of the hollow drum 5, the cylindrical surface thereof, comprising a filtering surface or medium formed from cloth or metal fabric or any porous filtering material, passes through the body of filtering mixture maintained in the bowl 3' of the filter, and then emerges therefrom during passage through the upper and hooded portion 6 of the filter.

The precipitated wax and admixed filter-aid material is deposited upon the exterior and submerged portion of the surface to form a filter cake, while the solvent and dissolved oil are forced through the filter surface into the interior of the drum. The liquid within the interior of the drum is withdrawn therefrom through the hollow rotating shaft 7, the filter valve 8, the pipe 9 in communication therewith, and into a filtrate storage tank 10. The tank 10 is maintained under a reduced pressure by means of vacuum exerted through a vacuum pump 11 communicating with the top of the tank through a pipe 12.

When that portion of filter surface over which filter cake is deposited emerges from the cold filtering mixture into the hooded portion of the filter, the application of vacuum upon the interior of that portion of the surface is continued for the purpose of removing mother liquor contained in the cake. Upon further rotation, washing liquid, such as naphtha, for example, from a tank 13 is applied to the surface of the filter cake through a pipe 14 and a nozzle 15 positioned within the hood 6 adjacent to the filter cake. This spray liquid is drawn through the cake into the interior of the drum and is separately withdrawn therefrom through the hollow shaft 7, filter valve 8 and pipe 16 into the storage tank 13. The vacuum pump 11 also communicates with the tank 13 by means of a pipe 17 for the purpose of creating a vacuum in the tank and also within the interior of the filter drum. This vacuum is continued after the filter cake has advanced beyond the nozzle 15 to permit drying the cake and maintaining it in a cold condition by drawing cold gas therethrough as will now be explained in more detail.

While the vacuum pump 11 is shown as taking direct suction on the tanks 11 and 13, it may be advantageous to interpose a foam trap between these tanks and the vacuum pump to remove entrained matter from the gas. Such a trap is preferably mounted about 35 or 40 feet above the tank and provided with a water leg through which liquid matter removed in the trap may be drawn off.

The exhaust gases from the vacuum pump 11 are advantageously conducted directly to a gas cooler 19. If desired, a fan or blower 18 may be used to reduce the back pressure on the vacuum pump.

The cooler 19 comprises a column packed with Raschig rings or other suitable packing means. Cooling liquid, preferably the solvent being used such as cold naphtha, at a temperature, for example, of about −40° F., is sprayed over the packing by which means it is brought into intimate contact with the gas passing upwards therethrough. The naphtha collecting in the bottom of the column, and at a temperature of about +40° F., is withdrawn by a pump 20 and passed through a chiller 21 wherein it is again chilled by interchanging heat with a refrigerant. Liquid ammonia may be expanded into the shell of the chiller to effect the necessary refrigeration.

The temperature to which the naphtha is chilled depends on the extent to which it is desired to cool the gas, and this in turn depends upon the character of the solid material being filtered. Usually it is desirable to keep the cake at substantially the same temperature as the filtering mixture. By maintaining the bottom of the column at a temperature above +32° F. any water removed from the gas may be withdrawn from the bottom of the column. It is desirable to keep the circulating gas free from water which might penetrate the cake and the fabric and deter filtration.

The chilled gas at a temperature, for example, of about −30° F., is then conducted through a pipe 22 to the hood 6 of the filter wherein it surrounds the filtering surface during its emergence from the filtering solution. This chilled gas is forced through the filter fabric prior to and subsequent to the removal of the filter cake therefrom. In this way, the cake and the filter surface are continually maintained at a temperature substantially nearly the same as that of the cold mixture undergoing filtration; for example, in this case at a temperature of from about 0° F. to −10° F.

To take care of gas losses, fresh gas may be drawn from the storage tank or gasometer 23 by the fan 18. The gas referred to herein may include air, flue gas, hydro-carbon vapor, fixed gases such as nitrogen and so forth. I have found it of advantage to use flue gas which is relatively inexpensive.

The cake is discharged from the filter surface after washing and drying by introducing, for a short period of time, a positive gas pressure to the interior of the particular segment of the filter drum in question, causing the filter fabric to bulge and loosen the cake which is then removed therefrom by scrapers 24. This reverse gas pressure may be effected by introducing chilled gas through the filter valve 8 from a line 25 leading from a suitable source of supply, as for example, the cooler 19.

The dislodged cake removed from the filter surface falls through the chutes 26 into a closed storage tank 27 from which it may be withdrawn for further treatment including the removal therefrom of retained oil and solvent as well as for the separation and recovery of the filter-aid material.

While a vacuum type of continuous filter has been described, it is contemplated that the invention is equally well adapted to pressure filtration wherein superatmospheric pressures may be maintained on the exterior of the filtering surface.

Figure 2:
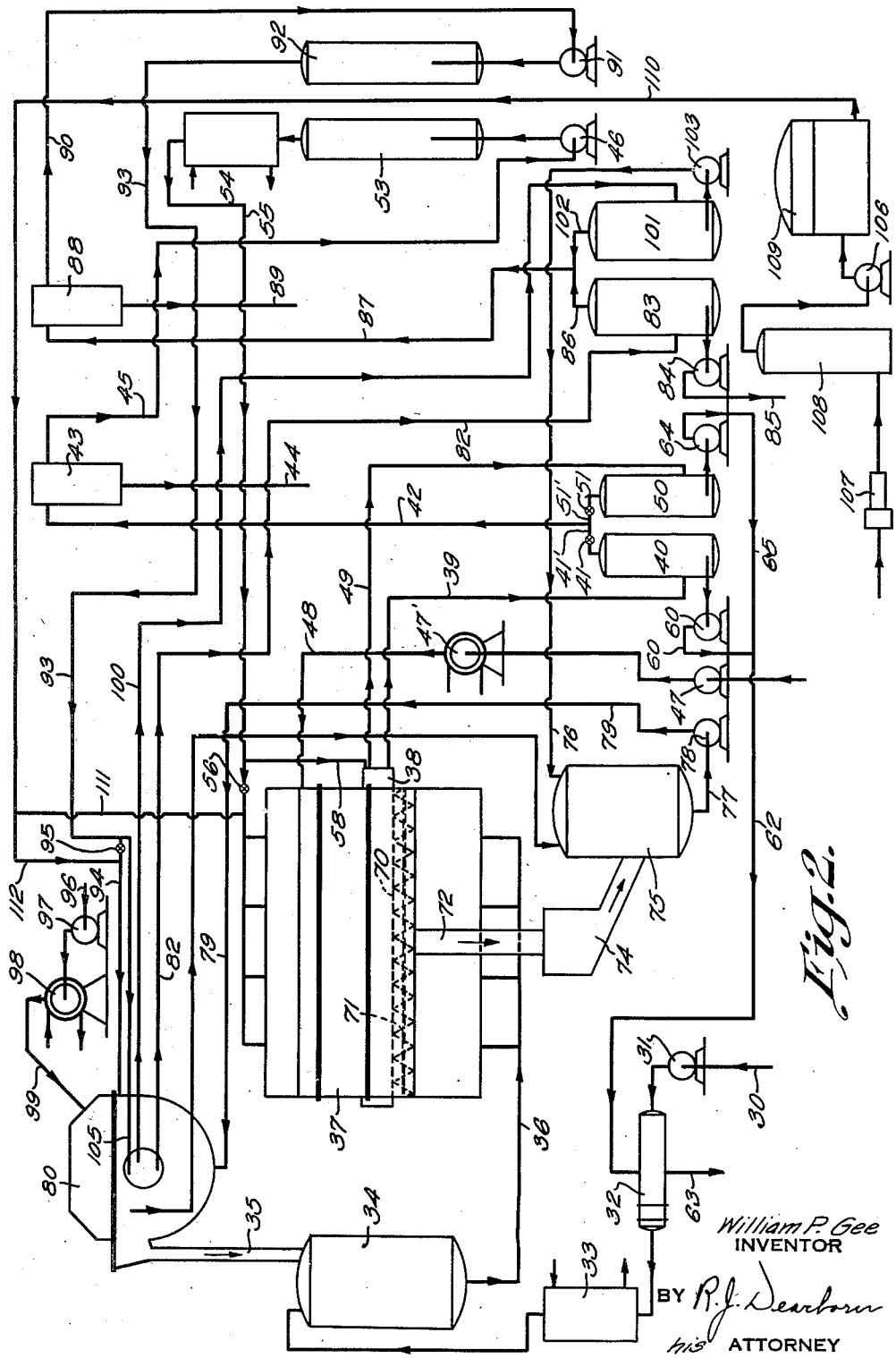
Fig. 2 is a diagrammatic view of a modified arrangement, illustrating the invention as applied to filter-aid dewaxing with recovery of filter-aid.

Referring to Fig. 2, there is disclosed a plant for filter-aid dewaxing by continuous filtration with continuous recovery of filter-aid, in which a foam trap is mounted between the filtrate and the wash solvent tanks and the vacuum pump in the manner described above. Wax-bearing oil is supplied from line 30 by pump 31 through heat exchanger 32 and chilling coils 33 to a mixing tank 34, where it is mixed with recovered filter-aid supplied through chute 35. The mixture then passes by line 36 to an enclosed rotary vacuum filter 37 of the type described above, and which operates with a continuous filtering cycle including pick-up or cake forming, washing, drying and cake discharge. In the cake forming stage, filtered oil is discharged from the valve 38 of the filter through line 39 to tank 40. The latter is connected by line 41 to a common suction line 42 leading to a foam trap 43 having a gravity leg 44 through which any trapped or entrained liquid is discharged into a barometric seal or drum, the separated gas passing by line 45 to the suction side of vacuum pump 46. Chilled wash solvent, supplied by pump 47 through chiller 47' and line 48 to the distributing means of the filter 37 at the washing stage of the filtering cycle, passes through the filter cake; and the mixed wash solvent and extracted oil discharge through line 49 to solvent storage tank 50. The latter is connected by pipe 51 to the common suction line 42 leading to the foam trap 43 and thence to suction pump 46 as described above.

The separated gas is supplied by pump 46 under pressure through a preliminary cooling tank 53 and a chiller 54 to line 55, and then through pressure reducing valve 56 to the interior of the filter casing, to continuously maintain the chilled gaseous atmosphere surrounding the filtering surface. Chilled gas at a suitable pressure, such as about 2 to 5 pounds gauge, may be passed through branch 58 to the proper passage in the valve 38 of the filter, to assist in the discharge of the cake in the blow-back portion of the cycle. Dewaxed oil is withdrawn from tank 40 by pump 60 and supplied through lines 61 and 62 to the heat exchanger 32, where it serves to partially cool the incoming oil to be dewaxed; and then passes by line 63 to a suitable point of storage for distillation for solvent recovery. The wash filtrate discharge may be in common with the oil filtrate discharge, as shown, where the wash filtrate is passed from tank 50 by pump 64 through lines 65 and 62 to discharge 63 for solvent recovery. Lines 41 and 51 are provided with valves 41' and 51' respectively, so that the vacuum produced by pump 46 in the tanks 40 and 50 may be independently controlled. In some gases, it is found desirable to maintain a higher vacuum or pressure differential on the filtering surface during the washing stage than during the pick-up or cake forming stage. For example, improved results have been secured by maintaining a vacuum or pressure differential of about 15 inches of mercury on the filtering surface during the time that the filtering surface is immersed in the chilled wax-bearing mixture and when the cake is being built upon the filtering surface, and a vacuum or pressure differential of about 25 inches of mercury on the filtering surface throughout the washing and drying portion of the cycle. This is conveniently effected by adjustment of the valves 41' and 51' which control the application of suction to the mentioned stages of the filtering cycle through the lines 39 and 49 respectively.

The mixed wax and filter-aid continuously removed by blow-back 58, assisted if desired by a suitable scraper or deflector blade, fall into a discharge trough 70 containing a scroll 71, which feeds the material to a discharge 72 terminating in a hopper 73, which in turn feeds through chute 74 into a hot mix tank 75. A solvent, such as naphtha, is supplied to the tank by line 76. The tank is equipped with a suitable agitator and a steam coil or jet (not shown), whereby the contents are mixed and heated to dissolve the wax in the solvent and to form a pumpable slurry of the filter-aid suspended in the wax solution. The slurry is withdrawn through line 77 by pump 78 and passed by line 79 to a continuous enclosed filter 80, which may be of similar construction to the filter 37, operating with stages of pick-up, washing, drying and cake discharge. In the pick-up or cake forming stage of the cycle, the filtrate of wax solution is discharged through the line 82 into tank 83, from which the wax solution may be withdrawn by pump 84 and passed through line 85 for recovery of the solvent from the contained wax. The upper portion of tank 83 communicates by lines 86 and 87 with a foam trap 88 having a gravity discharge leg 89 for any entrained liquid, and a gas discharge 90 communicating with the suction side of a vacuum pump 91 which discharges into an equalizing tank 92. Gas from tank 92 passes through lines 93 and 94, the latter containing pressure reducing valve 95, to the interior of the casing of the filter 80, to complete the gas cycle which minimizes solvent loss. During the washing stage on filter 80, heated wash solvent, such as naphtha, supplied from line 96 by pump 97 through heater 98 and line 99, is directed onto the formed filter cake to remove contained wax solution therefrom. The resulting solution is withdrawn through line 100 to solution tank 101, the vapor space of which is connected by line 102 with the common suction line 87 leading to foam trap 88 and vacuum pump 91. The resulting solution is withdrawn from tank 101 by pump 103 and returned by line 76 to serve as solvent liquid in the hot mix tank 75. Pressure gas from line 93 is supplied by branch line 105 as blow-back to remove the washed and dried cake of filter-aid material from filter 80. This cake is discharged into chute 35, which returns the filter-aid to mixer 34 for reuse in the process.

A pump 106 withdraws flue gas from a generator 107 through a scrubber and dehydrator 108, and forces the gas under a controlled pressure into a gasometer 109, which maintains a balanced pressure on the system. Flue gas is supplied from the gasometer 109 through line 110 to the interior of the filter casing 37 by means of line 111, and to the interior of filter 80 by means of line 112. The gasometer thus floats on the system, supplying a small amount of make-up gas as required to maintain the desired quantity and pressure of gas within the system. The pressure within the gasometer 109 is controlled to the desired pressure which is to be maintained within the filter casings by suitable regulation of pump 106.

It was formerly considered essential to employ filter-aid in connection with the dewaxing of certain distillate and residual oils by filtration. It has now been found that the use of filter-aid can be dispensed with in certain dewaxing processes employing filtration. This is advantageously accomplished by the employment of certain selective solvents or solvent mixtures, which at lower temperatures are solvents for the oil, but in which the precipitated wax is substantially completely insoluble; or by the use of solvents of low viscosity which give a crystalline wax on chilling. Examples of such selective solvents include a mixture of acetone and benzol, and a mixture of acetone, benzol and toluol; and propane is an example of the latter type of solvent of low viscosity. Very satisfactory results have been secured where a solvent consisting of substantially 35% by volume of acetone and 65% by volume of benzol is employed in the ratio of from two to four parts of solvent mixture to one part of wax-bearing oil. In the case of residual oils, a very satisfactory solvent mixture consists of about 28–35% acetone, 47–57% benzol and 15–18% toluol in substantially the same proportions of solvent mixture to oil. In such case, it is also found highly desirable to wash with the same selective solvent mixture. By the use of a solvent mixture of this character, the wax is precipitated in a form which admits of satisfactory filtration at commercial rates. By the use of such a selective solvent mixture for washing the formed wax filter cake, re-solution of some of the wax is avoided, and consequently the oil removed in the wash stage has substantially the same pour test as the filtrate, whereby the two may be mixed to give an increased dewaxed oil yield of the desired low pour test. When this is coupled with a gas recirculation system of the character disclosed herein, which maintains the filtering surface at all times at substantially the temperature of the wax-bearing mixture being filtered, successful operation of the filter over substantial periods of time is assured. Thus, by the co-operation of the several features, including the precipitation of the wax in a more suitable form for filtration, the maintenance of the filtering surface in a condition of high effectiveness, and the avoidance of re-solution of the wax cake, separation of wax by continuous filtration may be accomplished without the use of filter-aid.

Figure 3:
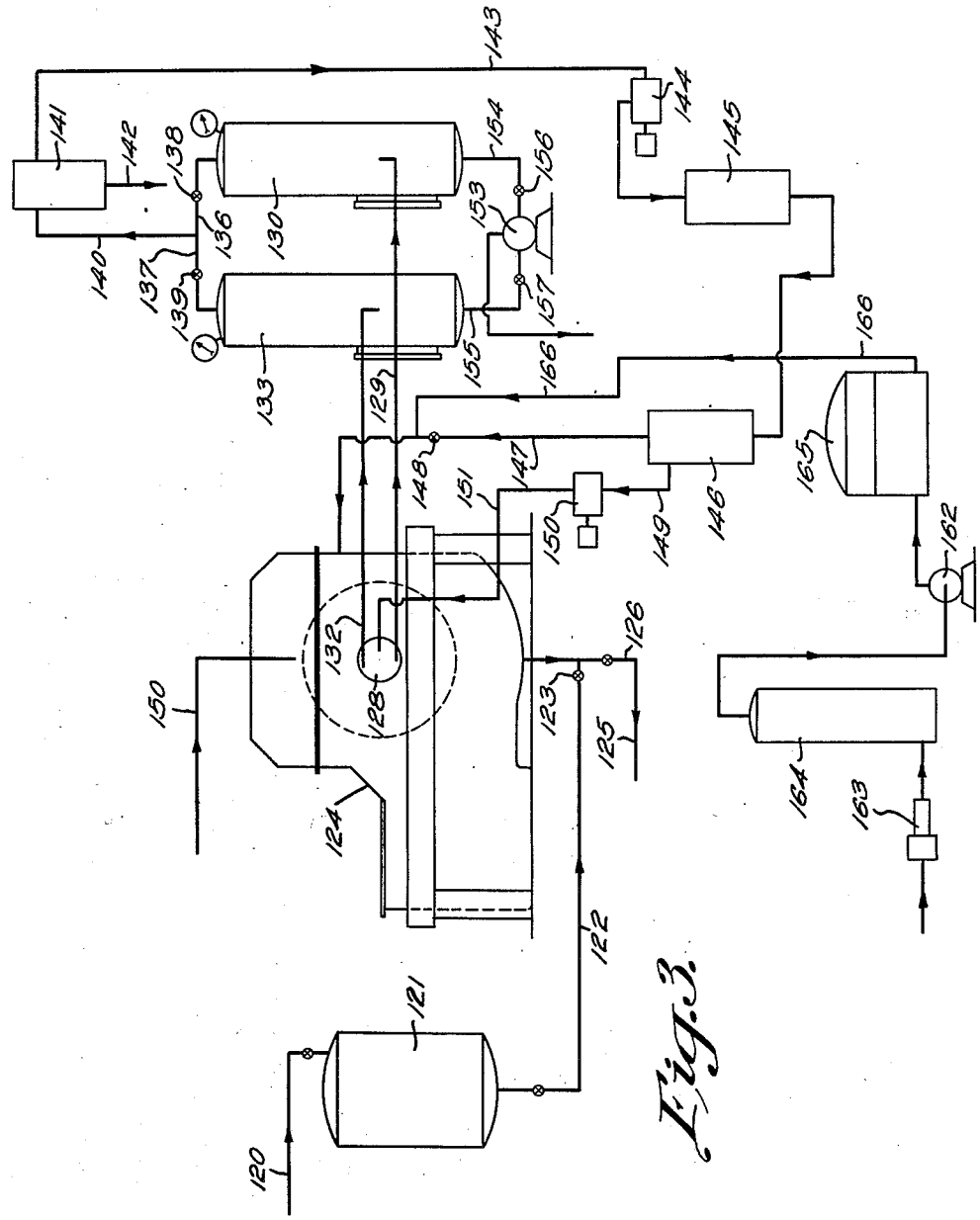
Fig. 3 is a diagrammatic view of still another modified form of apparatus in which filter-aid is not employed.

Referring to Fig. 3, there is shown a simplified plant for continuous filtration, in which filter-aid is not employed. The chilled wax-bearing oil is supplied through line 120 to feed tank 121 and thence by line 122 controlled by valve 123 to a continuous enclosed filter indicated generally at 124. A drain line 125 controlled by valve 126 is provided for draining the filter tank.

The continuous filter may be of the type previously described, operating with stages of pick-up, washing, drying and cake discharge. In the pick-up or cake forming stage of the cycle, filtrate is discharged from the usual control valve 128 through line 129 to tank 130. Wash filtrate is discharged through line 132 to tank 133. The upper portions of tanks 130 and 133 communicate through lines 136 and 137, respectively provided with valves 138 and 139, with a common suction line 140 leading to a foam trap 141 having a gravity discharge leg 142. Gas is withdrawn from foam trap 141 through line 143 by vacuum pump 144, and supplied under low pressure to preliminary cooler 145 and thence through chiller 146 and line 147 containing pressure reducing valve 148 to the interior of the closed filter casing to maintain the chilled gaseous atmosphere therein.

Where a solvent mixture of the character of acetone-benzol is employed for dewaxing, it is found desirable to use an indirect chiller 146, rather than the direct chiller shown in Fig. 1. For example, the chiller may be of suitable heat exchanger construction, having a bank of tubes through which the gas passes in indirect heat exchange relationship with a refrigerant, such for example as chilled brine, ammonia, $SO_2$ or other suitable refrigerant. A branch line 149 leads from chiller 146 to an auxiliary pump 150, which serves to force chilled gas at a regulated positive pressure, which is independent of fluctuations of pressure in the main circulation system, through the blow-back line 151 for discharge of the cake. A liquid discharge pump 153 serves to discharge the oil filtrate and the wash filtrate through lines 154 and 155, respectively controlled by valves 156 and 157, to a discharge line 158 leading to solvent recovery. Pump 162 draws flue gas from generator 163 through scrubber and dehydrator 164, and discharges the gas into gasometer 165. From the latter, gas is supplied through line 166 to line 147 beyond valve 148, and thus to the interior of the filter casing, to make up for any gas loss and to maintain the quantity and pressure of gas within the circulating system. Inasmuch as the gas loss is very small, the quantity of gas passing from the gasometer to the filter casing is insufficient to materially affect the temperature of the gaseous atmosphere therein.

Fig. 4 shows diagrammatically and in outline a rotary vacuum continuous filter of the type used in Figs. 1 to 3 for wax filtration, with the filtering cycle indicated thereon. The filtering surface is shown at 170, and is divided by division strips 171 into a plurality of longitudinal segments, indicated as 24 in number about the periphery of the filter, although of course the number may be varied. The customary filter valve which controls the application of suction and the supply of pressure blow-back gas to the interior of the filtering segments at various stages in the cycle of rotation of the filter, is indicated at 172. The liquid level of the chilled wax-bearing mixture within the vat or casing of the filter is shown at 173. The filter rotates in the direction of the arrow 174, and cake formation starts at 175. At this point, the filter valve opens to communicate suction to the filtering surface, which suction continues throughout the extent of the immersed portion of the filter, to provide the pick-up or cake forming area 176. The filtered oil from this section is discharged through the filtrate line as previously described. As the filtering segments consecutively emerge from the chilled mixture, their communication with the filtrate outlet is cut off at 178; and after a short rotation, communicaion with the washing and drying discharge port of the valve is initiated at 179. The action of the vacuum then creates a pressure differential on the filtering surface, which causes the chilled gaseous atmosphere surrounding the filter to act upon the cake during the drying stage 180, to drain or strip retained oil from the cake. The washing of the drained cake then commences, as indicated at 181.

So far as I am aware, all prior suggestions for washing a wax cake on a filter have been to apply sprays of washing solvent thereto. I have discovered that superior results are obtained by supplying the washing solvent to the cake in the form of a continuous liquid film which flows continuously onto the cake. This is accomplished by the weir feed, comprising the trough 182 which is mounted to extend longitudinally throughout the length of the filter, being supported in any suitable manner from the casing walls. Washing solvent is continuously supplied to the trough by supply pipe 183 so as to maintain a continuous overflow at the weir 184. This forms a sheet or film of liquid throughout the length of the filter, which flows down an inclined guide 185 onto the filter cake in a direction opposite to the direction of rotation of the filter. Sufficient washing liquid is supplied so as to maintain a thin liquid film over the exposed portion of the filtering surface substantially throughout the extent of the washing zone indicated at 186, the film being of course thicker at the upper portion adjacent the weir feed. The outer portion of the film flows downwardly over the filter cake countercurrent to the direction of the rotation of the filter, while the inner portion of the film adjacent the cake assumes movement along with the filter cake. The pressure differential existing upon opposite sides of the cake and liquid film tends to force the wash liquid down into the cake to displace remaining oil therefrom. Preferably, the quantity of wash liquid supplied, and the extent of the washing zone, is controlled to afford substantially complete displacement of retained oil from the cake, while avoiding the use of an excess of solvent which would needlessly drain through the cake after oil has been expelled. This displacement weir wash affords economy in the use of wash solvent, obtains an increased yield of dewaxed oil, and avoids solvent loss which I have found to be inherent in the use of sprays, when volatile solvents are employed.

Following the washing zone, the cake is then subjected to further pressure differential during the drying stage 188, at which time cold gas from the atmosphere surrounding the filter is drawn through the filtering surface to displace wash solvent as well as to maintain the filtering surface chilled to a low temperature. The liquids and gases drawn through the filter during the zone from 179 to 189, at which latter point the discharge passage is closed by the valve, are discharged through the wash solvent line as previously described. A full block 190 separates the termination of the vacuum and the initiation of blow-back at 191. At this point, chilled gas under pressure is discharged through the passage in the valve to the interior of the segments of the filter, causing distention of the filter cloth as indicated at 192. This, assisted by the scraper 193, serves to remove the formed and dried filter cake. The reverse flow of chilled gas or blow-back terminates at 194, and a full block indicated at 195 separates the termination of the cake discharge zone from the beginning of the cake forming zone at 175; whereupon the cycle is repeated.

In dewaxing by pressure filtration, it has been customary to employ pressures of from about 40 to 60 pounds per square inch or higher. In applying the principles of pressure filtration to an enclosed vacuum filter, the obvious thing is to use a gas pressure within the filter casing of substantially this amount, in order to increase the pressure differential acting on the filtering surface, with a view to increasing filtering rates and capacity. I have found, however, that instead of being beneficial, such increased pressures may be actually harmful, due to reduction in filtering rates. This is apparently due to the fact that the wax cake tends to compact under the increased pressure, thereby losing its pervious form of interwoven crystals, and becoming more or less of a slimy impervious mass. In accordance with the present invention, the chilled gaseous atmosphere within the filter casing is purposely maintained at such a pressure that a pressure differential on the filtering surface equivalent to not more than about 15 to 20 pounds per square inch is afforded. This is preferably accomplished by maintaining the gaseous atmosphere within the filter casing at substantially atmospheric pressure, or at only a few pounds above atmospheric pressure, the pressure differential being then secured by means of vacuum applied by the vacuum pump. This is effected in Figs. 2 and 3 by staging down the pressure of the gas being returned to the filter casing, as by the pressure reducing valves 56 and 148 respectively. This has the further advantage of minimizing gas leakage, thereby avoiding loss of associated solvent vapor.

Previous practice in connection with enclosed vacuum filters employing a pressure gas atmosphere therein, has been to either enclose the entire filter in a large casing forming in effect a filtering room, or to attempt to secure the cover of the filter casing to the vat or casing proper in gas tight relationship by bolting with the aid of sealing gaskets. The former practice is highly expensive; and the latter practice has the objection that frequent removal of the cover, which is necessary for adjustment, repair or replacement of parts, renders it difficult to maintain the proper sealing relationship when the cover is replaced.

The present invention overcomes these objections in the manner shown in Fig. 5, in which a commercial form of enclosed vacuum filter is shown in end elevation. The filter casing 200 is formed at its upper end with an outwardly extending flange 201. Entirely about the inner periphery of the upper portion of casing 200 is a narrow trough 202, to which is supplied a suitable sealing liquid 203. The removable cover 204 is formed with a surrounding reinforcing bar 205 carrying an outwardly extending flange 206 adapted to seat upon the flange 201 to support the cover. The latter carries a downwardly extending flange 207 about its periphery, which depends nearly to the bottom of the trough 202, and thus provides a liquid seal. Due to the fact that only a comparatively small gas pressure is maintained within the filter casing, a comparatively shallow trough 202 suffices to maintain the liquid seal. The cover is equipped with longitudinally extending handles 208 at opposite sides thereof, by which the cover may be attached to suitable chains or hooks of a conventional lifting mechanism or hoist, so that the cover may be easily and instantly removed and replaced.

While the invention has been described in connection with the separation of wax from waxbearing oils, it is to be understood that it is also applicable to the removal of similar types of solid materials from liquids wherein it is desirable to maintain the resulting cake of solids at a temperature below that at which the solids tend to liquefy and reach a condition where they penetrate the fabric and ultimately result in plugging.

Obviously many modifications and variations of the invention, as hereinbefore set forth, may be made without departing from the spirit and scope thereof, and therefore only such limitations should be imposed as are indicated in the appended claims.

I claim:
1. Apparatus for continuous dewaxing of a chilled wax-bearing mineral oil, comprising in combination, a continuous filter including a filter casing supporting a rotatable continuous filter element, a hood enclosing the filter casing, means for supplying a chilled gas to the interior of the filter casing to form a chilled gaseous atmosphere surrounding exposed portions of the filter element, means for continuously removing retained liquid from the wax cake on the filtering element by continuously passing a portion of the chilled gas through the cake and filtering element, means for separating gas from filtrate liquid, means for chilling separated gas, and means for returning the chilled gas to the supplying means for return to the filter casing.

2. Apparatus for the continuous separation of precipitated wax from chilled wax-bearing oil, comprising in combination, a continuous rotary filter having a gas tight casing, means for supplying chilled wax-bearing oil to the filter casing to partially immerse the filter therein, means for supplying a chilled fluid to the casing to provide a chilled gaseous atmosphere therein, a tank communicating with the filter to receive filtered oil therefrom, a vapor offtake from the tank, a foam trap connected to the vapor offtake, a gravity leg for liquid discharge from said foam trap, a suction pump, a suction connection from said foam trap to said pump, whereby the pump withdraws gas passed through the filter, a chiller, a pressure line from the pump to the chiller for supplying the withdrawn gas to the latter, and a connection for returning the chilled gas to the filter casing.

3. Apparatus for the continuous separation of precipitated wax from chilled wax-bearing oil, comprising in combination, a continuous rotary filter having a gas tight casing, means for supplying chilled wax-bearing oil to the filter casing to partially immerse the filter therein, means for supplying a chilled fluid to the casing to provide a chilled gaseous atmosphere therein, a blow-back connection for the filter to supply blow-back for discharging the cake, a tank communicating with the filter to receive filtered oil therefrom, a vapor off-take from the tank, a vacuum pump connected to the vapor off-take, a chiller, a pressure line from the pump to the chiller for supplying withdrawn gas to the chiller, a line for returning chilled gas to the filter casing, a branch line for supplying chilled gas to the blow-back connection of the filter to supply blow-back gas thereto, and a separate pump in said branch line.

4. Apparatus for continuous dewaxing of a chilled wax-bearing mineral oil, comprising in combination, a continuous filter including a filter casing supporting a rotary drum filter element, a hood enclosing the filter casing, the said drum having an axial shaft with a passage for discharge of filtrate, a pipe for supplying a chilled gas to the interior of the filter casing to form a chilled gaseous atmosphere confined within the filter casing by the said hood and surrounding exposed portions of the rotary drum filter element, a filtrate tank, a pipe connecting the said filtrate discharge passage with said filtrate tank, a vapor offtake from said filtrate tank, a pump positioned in said vapor offtake whereby operation of the pump draws filtrate liquid and chilled gas through the filter element into said filtrate tank and then withdraws gas from the filtrate tank, the discharge side of said pump being connected with said pipe supplying chilled gas to the interior of said filter casing, and a chiller within said last mentioned pipe.

5. Apparatus for continuous dewaxing of a chilled wax-bearing mineral oil, comprising in combination, a continuous rotary filter including a filter casing supporting a rotatable continuous filter element, said casing having a cover seating surface, a hood enclosing the filter casing resting in freely removable relationship on said casing seating surface, means providing a liquid seal for sealing said hood on the said casing in gastight relationship, means for supplying a chilled gas to the interior of the filter casing to form a chilled gaseous atmosphere surrounding exposed portions of the filter element, means for continuously removing retained liquid from the wax cake on the filtering element by continuously passing a portion of the chilled gas through the cake and filtering element, means for separating gas from filtrate liquid, means for chilling separated gas, means for returning the chilled gas to the supplying means for return to the filter casing, and means for regulating the pressure of said gaseous atmosphere to maintain a relatively low pressure therein such that any pressure differential existing between the inside and outside of said filter casing is ineffective to break the said liquid seal.

6. Apparatus for continuous dewaxing of a chilled wax-bearing mineral oil at temperatures of the order of 0° F. and below, comprising in combination, a continuous filter including a filter casing supporting a rotatable continuous filter element, a hood seating on the filter casing and closing the same, means for supplying a medium to the interior of the filter casing to form of itself a chilled gaseous atmosphere of a temperature approximating that of the wax-bearing oil being filtered between the said hood and the said filter casing and surrounding exposed portions of the filter element, means for continuously removing retained liquid from the wax cake on the filtering element by continuously passing a portion of the chilled gas through the cake and filtering element, means for separating gas from filtrate liquid, and means communicating with said supplying means for making up for gas discharged from the system, whereby said supplying means serves to maintain the chilled gaseous atmosphere within the said filter casing and enclosing hood.

7. Apparatus for continuous dewaxing of a chilled wax-bearing mineral oil at temperatures of the order of 0° F. and below, comprising in combination, a continuous filter including a filter casing supporting a rotatable continuous filter element, a hood seating on the filter casing, and closing the same, means for supplying a medium to the interior of the filter casing to form of itself a chilled gaseous atmosphere of a temperature approximating that of the wax-bearing oil being filtered between the said hood and the said filter casing and surrounding exposed portions of the filter element, means for continuously removing retained liquid from the wax cake on the filtering element by continuously passing a portion of the chilled gas through the cake and filtering element, means for separating gas from filtrate liquid, means for conditioning separated gas to form the medium effective to supply the chilled atmosphere within the said filter casing when returned thereto, and means for returning the conditioned medium to said supplying means for return to the filter casing.

WILLIAM PROVINE GEE.